Patented Aug. 31, 1943

2,328,353

UNITED STATES PATENT OFFICE 2,328,353

AZO DYESTUFF INTERMEDIATE

Neil Mitchill Mackenzie, Bound Brook, N. J., assignor to American Cyanamid Company, New York, N. Y., a corporation of Maine No Drawing. Application June 7, 1941,
Serial No. 397,086

7 Claims. (Cl. 260—397.7)

This invention relates to sulfonic acid and sulfonamide derivatives of acetoacetic amides and to a method for preparing these compounds which have the following general formula:

in which R is an aromatic, aralkyl, aliphatic or alicyclic radical, X is a radical included in the group consisting of $SO_3H$, $SO_2NH_2$ and their salts, $n$ is an integer included in the group consisting of 1 and 2, and $n'$ is an integer included in the group consisting of 1, 2 and 3.

The products of the present invention may be prepared by reacting diketene with amino sulfonic acids or amino sulfonamides. It is known that in many reactions amino sulfonic acids do not behave like other amines and are, rather, internal salts or hybrid ions and it is therefore surprising that amino sulfonic acids can be readily reacted with diketene to give corresponding sulfonic acid derivatives of acetoacetic amides. It is equally surprising that the amino sulfonamides undergo this reaction since in this case also an amino group and an acidic group are present in the molecule forming internal salts.

The reaction is carried out preferably in aqueous medium and the pH depends upon the specific compound to be reacted, although the preferred pH range is 4 to 7 since at a lower pH most of the amino sulfonic acids and amino sulfonamides are not sufficiently soluble and at a higher pH the yield is usually lower. In most cases room temperature is suitable although a temperature of 40–50° C. is preferred if it is desirable to increase the solubility of the amino sulfonic acid or the amino sulfonamide. The reactions are slightly exothermic and in some cases cooling of the reaction is advisable.

Suitable amino sulfonic acids, that may be reacted with diketene to give the sulfonic acid derivatives of the corresponding acetoacetic amide are: taurine, 1-amino-propane-2-sulfonic acid, 2-amino-2-methyl-propane sulfonic acid, amino cyclohexane sulfonic acids, benzylamine sulfonic acids, orthanilic acid, metanilic acid, sulfanilic acid, 4-amino-3-methyl-benzene sulfonic acid, 2-amino-5-methyl-benzene sulfonic acid, 2-chloro-5-amino-benzene sulfonic acid, 2-amino-4-methyl-5-chlorobenzene sulfonic acid, naphthionic acid, J acid, gamma acid, S acid, amino-azo-benzene sulfonic acid. The amino sulfonic acid that is reacted may also contain a carboxylic group; examples are 2-amino-5-sulfobenzoic acid, 2-hydroxy-3-amino-5-sulfobenzoic acid. The sulfonic acid may also contain two amino groups in which case two molecules of diketene react and as examples of this may be mentioned phenylene diamine sulfonic acids and benzidine-2,2'-disulfonic acid. Mono amino disulfonic acids or trisulfonic acids may be reacted with diketene, for example, aniline-2,5-disulfonic acid, H acid, Chicago acid, amino R acid, the azo dye aniline coupled alkaline on H acid or 1-amino-naphthalene-3,6,8-trisulfonic acid. Amino sulfonamides such as sulfanilamide or metanilamide may be used.

Many of the products of this invention are very soluble in water and in many cases it is necessary to evaporate the solution in order to isolate the compound, while in some cases the products may be readily salted out. If the compounds are to be used as coupling components in preparing azo dyes it is not necessary to effect their isolation as any by-products present do not enter into the coupling.

These intermediates are useful as coupling components for making azo dyes derived from acetoacetic amides and having sulfonic or sulfamide groups in the substituent of the amide radical. Of particular interest are those azo dyes that are obtained from diazo components having in the ortho position to the azo group a group enhancing complex formation with heavy metals. Such azo dyes may be converted into metallized dyes which are very valuable for dyeing wool.

The invention is illustrated but not limited by the following examples, in which the parts are given by weight.

Example 1

34.6 parts of sulfanilic acid are dissolved in a solution of 8 parts of sodium hydroxide in 135 parts of water. Then 5.0 parts of crystalline sodium acetate are dissolved therein and the pH is adjusted at 4–7. 19.0 parts of diketene is added at 20–25° C. over a period of one hour, the reaction mixture being stirred. The product may be isolated as a white powder by evaporation to dryness or the solution may be used directly in the manufacture of azo dyes. The product, which most probably has the following formula:

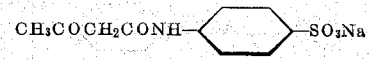

is easily soluble in water and couples readily with diazotized amines to give azo dyes.

If metanilic acid is condensed with diketene in a similar manner, a water soluble compound which couples easily with diazo compounds is obtained. Its chemical structure as free acid is represented in the following formula:

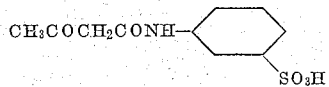

Example 2

37.4 parts of 3-methyl-4-aminobenzenesulfonic acid are dissolved in a solution of 8.0 parts of sodium hydroxide in 240 parts of water. The pH of the solution is adjusted at 4–7. Then 19.0 parts of diketene are added at 20–25° C. over a period of three hours while the reaction mixture is stirred and occasionally cooled. The new product may be precipitated in a colorless, crystalline form by the addition of salt, filtered off and dried. Or, the solution obtained may be used directly in the manufacture of azo dyes.

The new product is soluble in water and may be represented by the following formula:

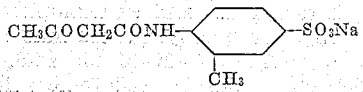

If 2-amino-5-methylbenzenesulfonic acid is used in place of 3-methyl-4-aminobenzene sulfonic acid in the above example, a water soluble product is obtained which has the following formula:

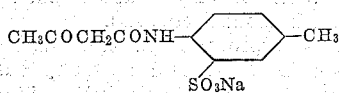

It is best isolated by evaporation to dryness.

Example 3

25.3 parts of aniline-2,5-disulfonic acid are dissolved in a solution of 4.5 parts of sodium hydroxide in 75 parts of water and the pH of the solution is adjusted to about 4–7. Then 14.2 parts of diketene are added over a period of two hours at 20–25° C. with good stirring. The product is isolated as a colorless crystalline precipitate by the addition of salt, filtered off and dried. It is a sodium salt of the following acid:

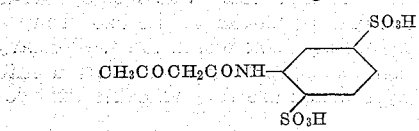

It is soluble in water. Upon the addition of salt to a concentrated solution, crystals in the form of parallelogram shaped plates are obtained.

Example 4

41.5 parts of 2-chlor-5-aminobenzene sulfonic acid are dissolved in a solution of 8.0 parts of sodium hydroxide in 240 parts of water. The solution formed is adjusted to a pH of about 4–7. Then 18.5 parts of diketene are added at 20–25° C. over a period of two hours with occasional cooling and good stirring. Upon the addition of salt, the new product crystallizes out in the form of colorless needles, which are filtered off and dried. The product, which is readily soluble in water, has the following formula:

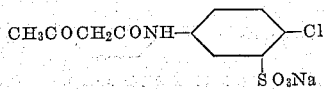

Example 5

24.3 parts of the sodium salt of 2-amino-4-methyl-5-chlorbenzene sulfonic acid are slurried in 180 parts of water containing 3.0 parts of crystalline sodium acetate. Sufficient 20% acetic acid solution is then added to bring the pH to about 5–7. Then 16 parts of diketene are added with good stirring over a period of four hours at 40–42° C. The insoluble starting material disappears at the end of the reaction and a clear solution is formed. Upon the addition of common salt, the product separates out in the form of a precipitate of colorless needles. The product, which is soluble in water and is a valuable intermediate for azo dyestuffs, has the following structural formula:

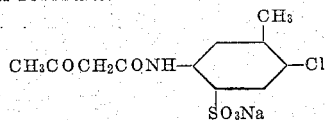

Example 6

98.0 parts of the sodium salt of naphthionic acid are added to a solution of 10.0 parts of crystalline sodium acetate in 200 parts of water and stirred to a smooth slurry. The pH is adjusted at 5–7. Then 48 parts of diketene are added at 20–25° C. with good stirring over a period of eight hours. During the reaction sodium naphthionate disappears and the new product partially separates out in colorless crystalline form. This product is isolated by the addition of salt, filtered off and dried. It is soluble in water and is a valuable intermediate for azo dyes. The new product may be represented by the following structural formula:

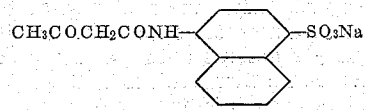

Example 7

4.66 parts of 3-amino-4-hydroxy-5-carboxybenzene sulfonic acid are dissolved in a solution of 1.3 parts of sodium hydroxide and 1.0 parts of crystalline sodium acetate in 60 parts of water. Then 2.2 parts of diketene are added during good stirring at 20–25° C. over a period of four hours. Upon the addition of common salt, the product separates as a crystalline precipitate of long needles. It is then filtered off and dried.

The new product obtained above is a sodium salt of the following acid:

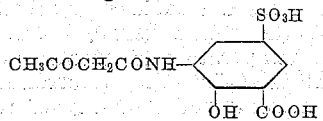

Example 8

To a solution of 7.5 parts of crystalline sodium acetate and 3.0 parts of sodium hydroxide in 90 parts of water, 31.9 parts of 1-amino-8-hydroxynaphthalene-3,6-disulfonic acid are added and stirred to a smooth slurry. Then 11 parts of diketene are added over a period of 20 minutes at 20–25° C. with occasional cooling in an ice bath and with efficient stirring. The new product is precipitated in crystalline form by the addition of salt, is filtered off and dried. This new product is a sodium salt of the following acid:

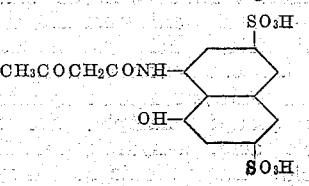

Example 9

12.5 parts of 1-aminoethane-2-sulfonic acid are added to a solution of 1.0 part of crystalline sodium acetate in 55 parts of water and stirred to a smooth slurry. Then 9.8 parts of diketene are added over a period of seven hours during good stirring at 20–25° C. During the addition of diketene, the pH is held at 5–7 by the continuous addition of 10% sodium carbonate solution. At the end of the reaction the 1-aminoethane-2-sulfonic acid disappears and a clear solution is formed. This solution can be used directly in the manufacture of azo dyes, or the new product can be isolated by evaporation. This new product may be represented by the following formula:

$CH_3COCH_2CONHCH_2CH_2SO_3Na$

Example 10

5.94 parts of 4.4'-diaminodiphenyl-2,2'-disulfonic acid are dissolved in a solution of 1.42 parts of sodium hydroxide and 1.0 part of sodium acetate (crystalline) in 35 parts of water. Then the pH is adjusted at 5–7. 4.0 parts of diketene are added at 20–25° C. over a period of one hour, the reaction mixture being stirred. The solution obtained can be used directly in the manufacture of azo dyes or the product can be isolated by evaporation to dryness. The new product is soluble in water and couples readily with diazotized amines to form azo dyes. Its structural formula is shown below:

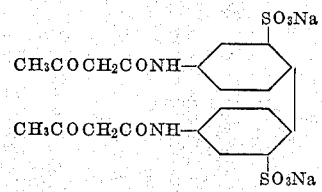

Example 11

6.54 parts of diketene are added at 22–25° C. to a fine suspension of 8.6 parts of metanilamide in 50 parts of water over a period of 30 minutes, the reaction mixture being stirred. After the diketene has entirely reacted, the product is dissolved by heating. On cooling, the product separates in crystalline form (colorless prisms) and is filtered off. It couples readily with diazo compounds to form dyes. Its structure is shown in the following formula:

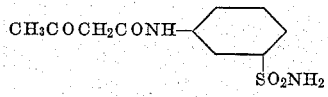

Example 12

To a smooth suspension of 13.9 parts of aminoazobenzene sulfonic acid in 400 parts of water, 11 parts of diketene are added over a period of two hours. The mixture is then stirred until the diketene has all reacted. The product obtained is partially precipitated. After the addition of common salt it is filtered off and dried. It reacts with diazo compounds to give disazo dyes. Its formula is shown below:

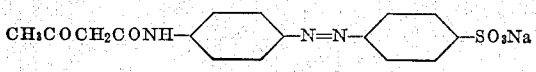

Example 13

17.2 parts of sulfanilamide are suspended in finely divided form in 125 parts of water. 5.0 parts of crystalline sodium acetate are added to the suspension and the whole is stirred until the acetate is dissolved. The mixture is heated to 40° C. Diketene is then added slowly with good stirring over a period of several hours at 40° C. until all the sulfanilamide has been converted to the acetoacetyl derivative. After cooling to ordinary temperatures the colorless crystalline product is filtered off and dried. The new product, which has the following formula:

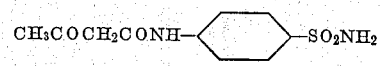

is slightly soluble in cold water. It couples with diazotized amines to form azo dyes.

Example 14

By the method outlined in Example 9 diketene will react with amino-methane sulfonic acid (obtained from formaldehyde-bisulfite and ammonia as described by F. Raschig and W. Prahl in Justus Liebig's "Annalen der Chemie," volume 448, page 265) to form a water soluble sulfonic acid which, in the form of its sodium salt, has the following structure:

$CH_3COCH_2CONHCH_2SO_3Na$

It is a valuable intermediate for the preparation of azo dyestuffs.

What I claim is:

1. A method for preparing compounds corresponding to the formula:

$(CH_3COCH_2CONH)_nRX_{n'}$ in which R is an aromatic radical, X is a member of the group consisting of $SO_3H$, $SO_2NH_2$ and their salts, $n$ is an integer included in the group consisting of 1 and 2, and $n'$ is an integer included in the group consisting of 1, 2, and 3, by reacting diketene with a compound included in the group consisting of the corresponding amino sulfonamides, amino sulfonic acids and their salts.

2. A method according to claim 1 in which the reaction is carried out in an aqueous medium at a pH of between 3 and 9.

3. A method according to claim 1 in which X is a member of the group consisting of $SO_3H$ and its salts.

4. A method according to claim 1 in which X is a member of the group consisting of $SO_2NH_2$ and its salts.

5. New products having the following formula:

$(CH_3COCH_2CONH)_nRX_{n'}$ in which R is a radical included in the group consisting of hydrocarbon radicals of the benzene and biphenyl series, X is a member of the group consisting of $SO_3H$, and its salts, $n$ is an integer included in the group consisting of 1 and 2, and $n'$ is an integer included in the group consisting of 1, 2 and 3.

6. Acetoacetyl metanilic acid

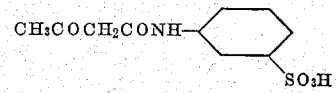

7. Acetoacetyl sulfanilic acid

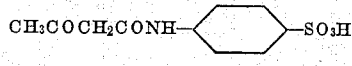

NEIL MITCHILL MACKENZIE.